UNITED STATES PATENT OFFICE.

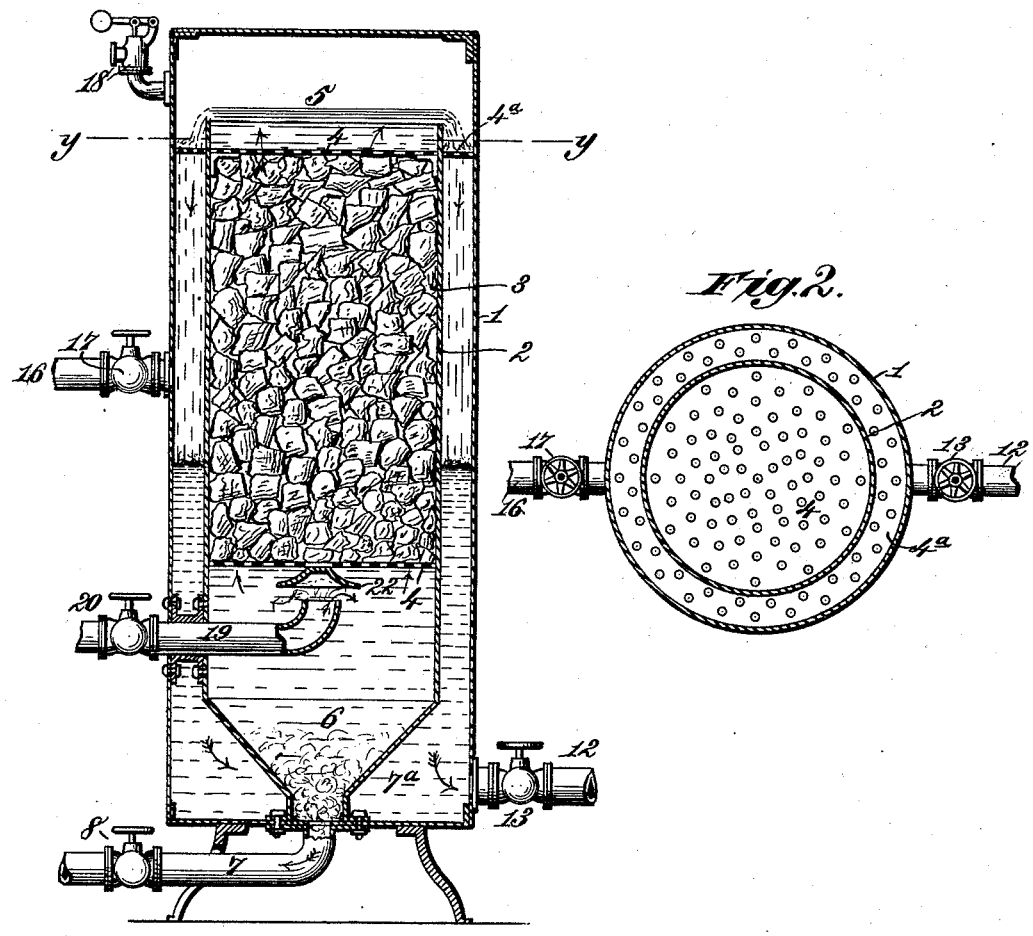

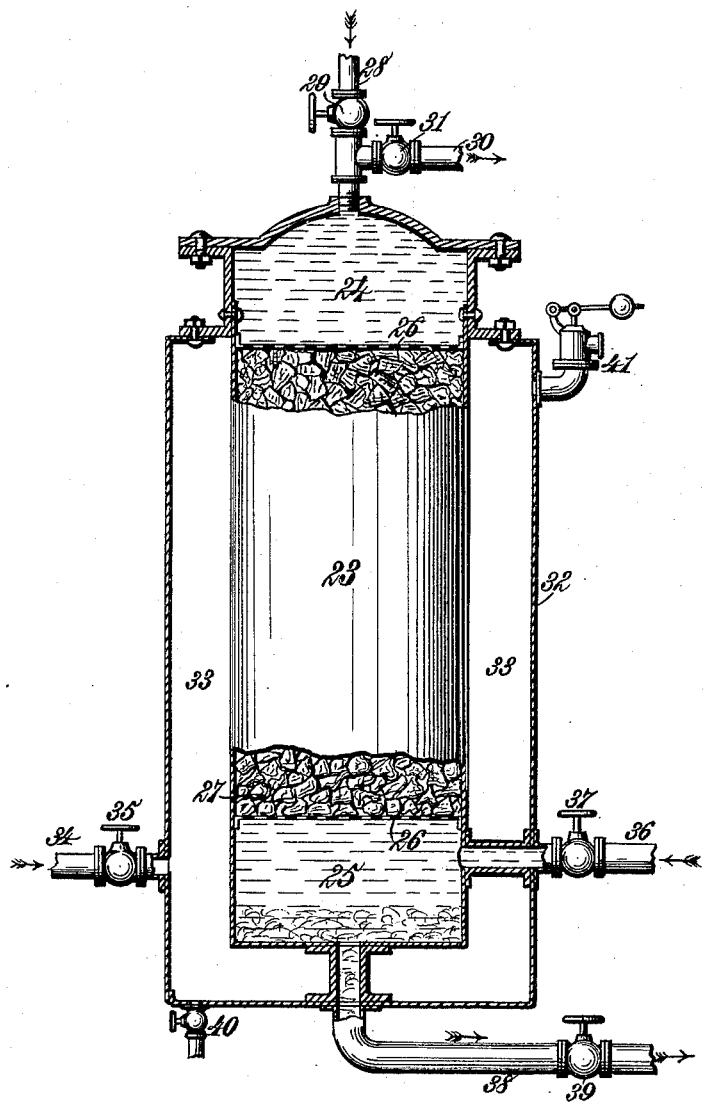

WILLIAM W. SUTCLIFFE AND JOHN D. SULLIVAN, OF NEW ORLEANS, LOUISIANA.

HEATING AND FILTERING APPARATUS.

SPECIFICATION forming part of Letters Patent No. 431,924, dated July 8, 1890.

Application filed September 11, 1889. Serial No. 323,602. (No model.)

*To all whom it may concern:*

Be it known that we, WILLIAM W. SUTCLIFFE and JOHN D. SULLIVAN, citizens of the United States, residing at New Orleans, in the parish of Orleans and State of Louisiana, have invented new and useful Improvements in Heating and Filtering Apparatus, of which the following is a specification.

Our present invention relates to filtering and heating apparatus, whereby water and other liquids may be freed from impurities and other foreign matter and heated prior to and during its passage through the filter, thereby aiding the elimination of foreign matter, expediting the passage of the fluid through the filter, and preparing it for any subsequent use in which heat is a factor.

It is the purpose of our invention to provide a simple apparatus wherein water or other fluid may be rapidly and continuously heated, filtered, and conducted to any other point or points for further operation, and in which the filtering material may be cleansed by simply reversing the current and driving the fluid back through the filter by steam-pressure.

The invention consists in the several novel features of construction and new combinations of parts hereinafter fully set forth, and then pointed out in the claims following this specification.

To enable others skilled in the art to practice said invention, we will now proceed to describe the same in detail, reference being had to the accompanying drawings, in which—

Figure 1 is a central vertical section of an apparatus embodying our invention. Fig. 2 is a horizontal section of Fig. 1 in the line $y\ y$. Fig. 3 is a central vertical section showing a modified construction.

In the said drawings the reference-numeral 1 denotes a closed casing, formed of any suitable material, and preferably cylindrical in form, though other shapes may be used, if preferred. Within this casing is arranged a casing 2, of substantially similar form, but of less diameter and length, whereby an annular space is provided between the inner and outer casings. The inner casing 2 is provided with a filtering-chamber 3, filled with coke or other suitable material for the purpose, confined above and below by a reticulated or perforated diaphragm 4, the upper diaphragm being arranged somewhat below the upper edge or rim of the vessel 2, whereby a water-space 5 is provided. The lower diaphragm is arranged at such a point that a sediment-chamber 6, of suitable dimensions, is provided in the lower end of the casing 2, which may be funnel-shaped, in order to guide the accumulation of foreign matter to an exit. A blow-off pipe 7 enters the contracted end of the funnel-shaped portion and passes outside the lower end of the outer casing, where it is provided with a cut-off or valve 8, of any suitable form.

Surrounding the top of the cylindrical casing 2 is a distributing-plate $4^a$, of annular form, extending from the top of the casing 2 to the wall of the outer casing, and preferably on a level, or thereabout, with the diaphragm 4. This plate overhangs the filtered-fluid space $7^a$, which communicates with the exterior by an outlet-pipe 12, having a valve 13. The distributing-plate $4^a$ is provided with numerous openings 14, which divide the filtered fluid overflowing from the space 5 into small streams. A relief-valve 18 is placed in a pipe communicating with the steam-space between the filter-chamber and the outer chamber. A feed-water-inlet pipe 19, provided with a valve 20, enters the outer casing and passes through the water-space $7^a$ and enters the sediment-chamber 6, its discharge end being preferably turned upward. A diffusing-plate 22 may be placed centrally on the lower diaphragm 4, in order to disperse the water over the surface of the latter.

In the modified construction shown in Fig. 3 the numeral 23 designates the filter-casing, which is preferably of cylindrical form and extended both above and below the filter to form a chamber 24 above and a sediment-chamber 25 below. The filter itself is constructed by inclosing in the casing 23, between the two perforated diaphragms 26, a body of coke or other suitable material 27. A steam-pipe 28 enters the top of the chamber 24 and is provided with a valve 29, and between this valve and the top of the chamber an outlet-pipe 30 connects with the steam-pipe, a valve 31 being provided in said pipe. Surrounding the filter below the chamber 24 is a jacket or shell 32, which extends below the bottom of the sediment-chamber 25. This casing wholly surrounds and incloses said parts, forming a steam-space 33, which is supplied with steam by a pipe 34, having a valve 35. An inlet-pipe 36, having a valve 37, enters the outer casing and traverses the steam-space 33, communicating with the sediment-chamber 25. A blow-off pipe 38, having a valve 39, passes up through the bottom of the outer casing and enters the bottom of the sediment-chamber, and a petcock 40 drains the water of condensation from the bottom of the jacket 32. A relief-valve 41 is mounted on the said jacket to avoid danger from overpressure.

The operation of the apparatus is as follows: The fluid flowing through the inlet-pipe 19 in Fig. 1 passes into the sediment-chamber and is driven up through the filter, filling the fluid-receptacle 5, whence it overflows and runs over upon the distributing-plate $4^a$, by which it is divided into fine streams. In flowing down through the space between the outer casing and filter it acquires a high temperature from the steam supplied by the pipe 16 and passes from the filtered-fluid space $7^a$ below to the pipe 12. The fluid is first heated upon entering the sediment-chamber 6, which derives heat from the hot filtered fluid which lies in the space $7^a$, and it is further heated by passing through the filtering material 3. By the preliminary rise in the temperature a portion of the foreign matter is precipitated to the bottom of the sediment-chamber 6, and the passage of the fluid through the filter and the further separation of impurities are aided and expedited.

To cleanse the filter, the outlet-valve 13 and inlet-valve 20 are closed and the blow-off valve 8 is opened, whereupon the steam-pressure produces a reverse current in the filter, driving the fluid back, effectually expelling the accumulated sediment in the chamber 6 and cleaning the filtering material.

In the modified form of apparatus shown in Fig. 3 the operation is similar to that described, save that the filtered fluid passes out by the way of the chamber 24, pipe 28, and pipe 30, while the steam supplied by the pipe 34 has no direct contact with the fluid.

To clean the filter, the inlet-pipe 36 and the outlet-pipe 30 are closed and the valves 39 and 29 are opened, whereby the steam-pressure acts upon the fluid in chamber 24, driving it back through the filter, cleansing the coke, and expelling the sediment from the chamber 25.

The invention may be employed for filtering and heating any kind of fluid, and may be used as a feed-water heater and filter or for any other purpose.

What we claim is—

1. In a heating and filtering apparatus, the combination of an outer casing having an outlet-pipe for connecting with a tank or other receptacle, an inner casing having a water-chamber above from which the filtered water overflows into the outer casing, a sediment-chamber below, an intermediate filter-chamber, a blow-off pipe attached to the lower end of the inner casing, an inlet-pipe for water, and a steam-pipe for delivering steam into the outer casing, substantially as described.

2. In a heating and filtering apparatus, the combination, with a filter-casing having a chamber above and a sediment-chamber below, of a jacket or shell surrounding the filter and sediment chamber, an inlet-pipe, and a blow-off, both entering said chamber, a steam-pipe entering the outer jacket, and a steam-pipe entering the chamber above the filter and having a valve and an outlet entering the steam-pipe between said valve and chamber, substantially as described.

3. In a heating and filtering apparatus, the combination, with a filter-casing having filtering material inclosed therein between perforated diaphragms and provided with a chamber above said filter and a sediment-chamber below, of a jacket or shell inclosing the filter below the upper chamber and surrounding the sediment-chamber, an inlet-pipe entering the sediment-chamber and having a valve, a blow-off pipe communicating with the bottom of said chamber and having a valve, a steam-pipe entering the jacket, a steam-pipe entering the upper chamber and having a valve, an oulet-pipe having a valve and communicating with the said steam-pipe between the valve in the latter and the top of the chamber, and a relief-valve mounted on the jacket, substantially as described.

In testimony whereof we have affixed our signatures in presence of two witnesses.

WM. W. SUTCLIFFE.
JOHN D. SULLIVAN.

Witnesses:
JNO. S. MCDONALD,
J. E. VAQUIN.